United States Patent
Milazzo et al.

(10) Patent No.: US 12,120,215 B2
(45) Date of Patent: Oct. 15, 2024

(54) SYSTEM FOR RESTRICTIVE DISCOVERY OF PRIVATE DATA FEATURE INTERSECTION

(71) Applicant: Accenture Global Solutions Limited, Dublin (IE)

(72) Inventors: Andrea Maria Milazzo, Antibes-Juan les Pins (FR); Haris Pasic, Biot (FR)

(73) Assignee: Accenture Global Solutions Limited, Dublin (IE)

(*) Notice: Subject to any disclaimer, the term of this patent is extended or adjusted under 35 U.S.C. 154(b) by 588 days.

(21) Appl. No.: 17/498,954

(22) Filed: Oct. 12, 2021

(65) Prior Publication Data

US 2023/0113896 A1  Apr. 13, 2023

(51) Int. Cl.
| | |
|---|---|
| *H04L 9/00* | (2022.01) |
| *G06F 16/903* | (2019.01) |
| *G06F 16/9035* | (2019.01) |
| *G06F 21/62* | (2013.01) |
| *G06N 20/00* | (2019.01) |
| *G06Q 20/40* | (2012.01) |
| *H04L 9/08* | (2006.01) |

(52) U.S. Cl.
CPC ........ *H04L 9/008* (2013.01); *G06F 16/90335* (2019.01); *G06F 21/6227* (2013.01); *G06N 20/00* (2019.01); *G06Q 20/401* (2013.01); *H04L 9/0819* (2013.01); *H04L 9/0869* (2013.01); *H04L 9/50* (2022.05)

(58) Field of Classification Search
CPC ..... H04L 9/008; H04L 9/0819; H04L 9/0869; H04L 9/50; G06F 16/90335; G06F 21/6227; G06N 20/00; G06Q 20/401
See application file for complete search history.

(56) References Cited

U.S. PATENT DOCUMENTS

| | | | | |
|---|---|---|---|---|
| 11,310,207 | B1* | 4/2022 | Davey | H04L 63/0442 |
| 2009/0006855 | A1* | 1/2009 | Tuyls | H04L 9/3218 |
| | | | | 713/182 |
| 2016/0365973 | A1* | 12/2016 | van Deventer | H04L 9/0625 |
| 2017/0222800 | A1* | 8/2017 | Haber | H04L 9/0894 |
| 2020/0082113 | A1* | 3/2020 | Van Liesdonk | G06Q 10/087 |
| 2021/0157932 | A1* | 5/2021 | Blatt | H04L 9/0643 |
| 2022/0004654 | A1* | 1/2022 | Patel | G06F 21/602 |
| 2022/0078023 | A1* | 3/2022 | Nicolas | G06F 21/602 |
| 2022/0284114 | A1* | 9/2022 | Klein | G06F 21/602 |
| 2023/0053566 | A1* | 2/2023 | Horne | G06F 21/6227 |
| 2023/0359631 | A1* | 11/2023 | Badrinarayanan | |
| | | | | G06F 21/6245 |
| 2023/0401331 | A1* | 12/2023 | Xu | H04L 9/0894 |

* cited by examiner

*Primary Examiner* — Catherine Thiaw
(74) *Attorney, Agent, or Firm* — Polsinelli PC

(57) ABSTRACT

This disclosure is directed to a computer system and method to assist in identifying data feature intersection or overlap between private datasets without revealing any specific data items or data features in the datasets. Various technical components including natural language processing, lexical optimization, and encryption and key management technologies such as homomorphic encryption and secret sharing and coding, are integrated into the disclosed system and method to achieve the data feature intersection identification. Such a system and method may be employed in circumstances where data feature intersection is important for collaborative efforts between entities.

20 Claims, 8 Drawing Sheets

SYSTEM FOR RESTRICTIVE DISCOVERY OF PRIVATE DATA FEATURE INTERSECTION

BACKGROUND

Technical Field

This application relates to a computer system and method to assist in identifying data feature intersection or overlap between private datasets without revealing any specific data items and data features.

Description of Related Art

In many circumstances, it may be desirable to compare private datasets of different entities to understand whether and to what extent these datasets generally share common features without revealing any privacy with respect to specifics about these data features. It may be desirable to further identify datasets having such overlap or intersection across the entities in terms of data features without revealing specific data items and data features in the datasets.

BRIEF SUMMARY

The disclosure below is directed to a computer system and method to assist in identifying data feature intersection or overlap between private datasets without revealing any specific data items or data features in the datasets. Various technical components including natural language processing (NPL), lexical optimization, and encryption and key management technologies such as homomorphic encryption and secret key sharing and coding, may be integrated into the disclosed system and method to achieve the private data feature intersection identification. Such a system and method may be employed in circumstances where data feature intersections are important for collaborative efforts between entities.

In some implementations, a system is disclosed for identifying data feature intersection or overlap between private datasets without revealing any specific data items or data features in the datasets. The system may include a memory for storing computer instructions and a data processing circuitry and network interface circuitry in communication with the memory. The data processing circuitry and network interface circuitry may be configured to execute the computer instructions to receive an encryption key and a first partial decryption key reference corresponding to the encryption key; encrypt a requestor dataset using the encryption key and using a predefined homomorphic encryption algorithm to generate a listing of homomorphically encrypted requestor descriptors; send the listing of homomorphically encrypted requestor descriptors to a data source; receive a list-matching indicator encrypted using the predefined homomorphic encryption algorithm from the data source indicating an overlap between the requestor dataset and a comparer dataset at the data source; request and receive a second partial decryption key reference corresponding to the encryption key from the data source; generate a decryption key corresponding to the encryption key from the first partial decryption key reference and the second partial decryption key reference; decrypt the list-matching indicator that is homomorphically encrypted to generate a decrypted list-matching indicator using the decryption key; and identify a subset of data items of the comparer dataset as matching the requestor dataset according to the decrypted list-matching indicator.

In some other implementations, another system is disclosed for identifying data feature intersection or overlap between private datasets without revealing any specific data items or data features in the datasets. The system may include a memory for storing computer instructions and a data processing circuitry and network interface circuitry in communication with the memory. The data processing circuitry and network interface circuitry may be configured to execute the computer instructions to receive an encryption key and a partial decryption key reference corresponding to the encryption key; receive a listing of homomorphically encrypted requestor descriptors from a requesting device, the listing of homomorphically encrypted requestor descriptors generated by the requesting device using the encryption key and using a predefined homomorphic encryption algorithm applied to a requestor dataset; retrieve an original comparer dataset; extract textual data features or description data items from a data column of the original comparer dataset; expand the textual data features or description data items to include additional words or phrases; generate a requestor dataset by numericizing the expanded textual data features or description data items; generate a list-matching indicator indicating an overlap between the requestor dataset and the listing of homomorphically encrypted requestor descriptors; encrypt the list-matching indicator to generate a homomorphically encrypted list-matching indicator using the predefined homomorphic encryption algorithm; send the homomorphically encrypted list-matching indicator to the requesting device; and in response to a key reference request from the requesting device, send the partial decryption key reference to the requesting device.

DETAILED DESCRIPTION

Figure 1:
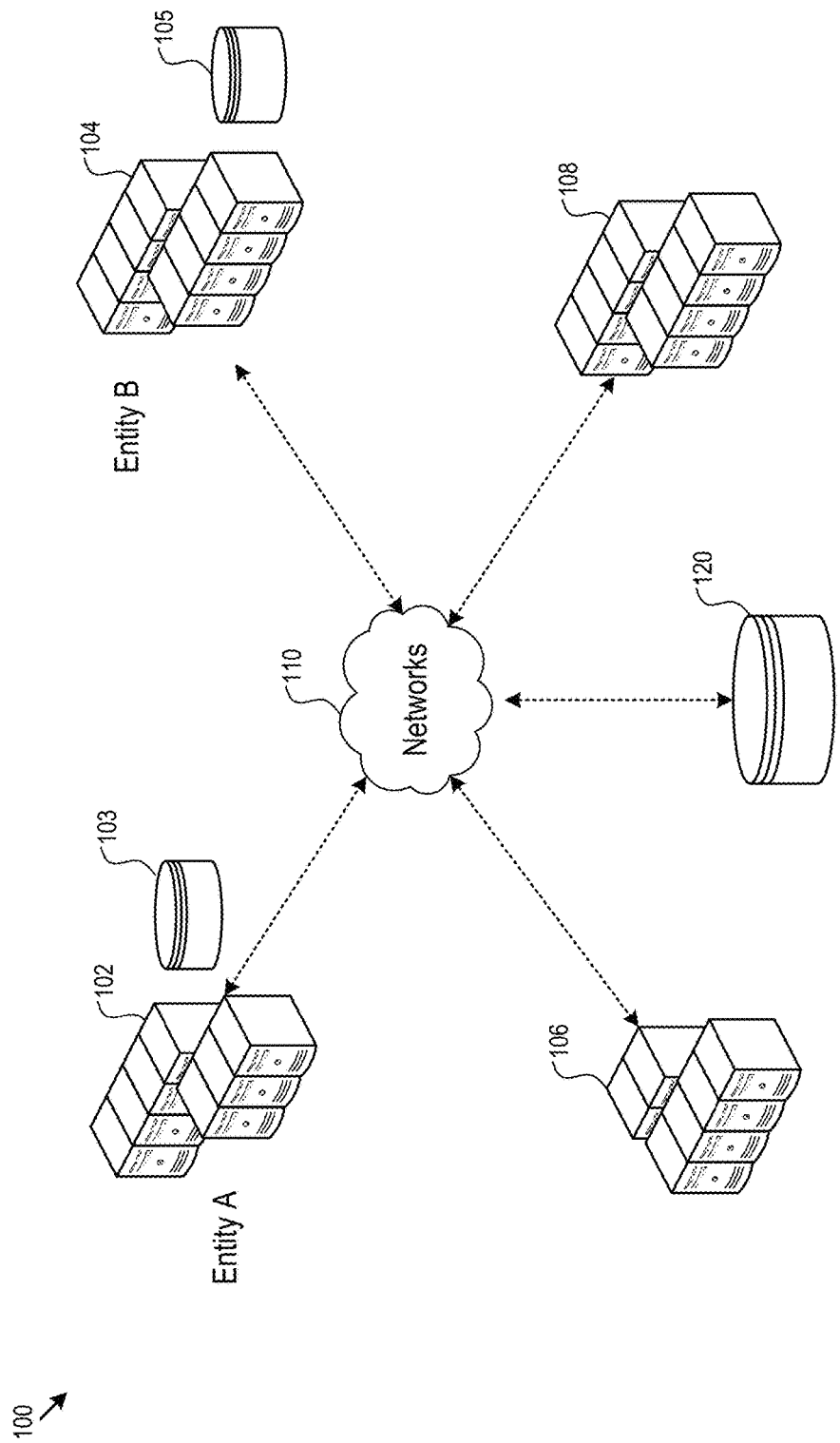
FIG. 1 illustrates an exemplary computing system for facilitating identification of data feature intersection between datasets of different entities with privacy protection.

This system will now be described in detail hereinafter with reference to the accompanied drawings, which form a part of the present disclosure, and which show, by way of illustration, examples of embodiments. The system may, however, be embodied in a variety of different forms and, therefore, the disclosure is intended to be construed as not being limited to the embodiments set forth. Further, the disclosure may be embodied as methods, devices, components, or systems. Accordingly, embodiments of the disclosure may, for example, take the form of hardware, software, firmware or any combination thereof.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

By way of introduction, it may be desirable in many collaborative circumstances to compare private datasets belonging to different entities to understand whether and to what extent these datasets generally share common or similar data features without revealing any private data with respect to specifics about these data features and the data items in these datasets. It may be also desirable to further identify such datasets having such common or similar data features without revealing the private data for various types of collaborative applications.

Without being limited to such a context, this disclosure is directed to an exemplary computer system and method to assist in identifying data feature intersection or overlap across different private datasets without revealing private data and/or specific characteristics in the datasets. In particular, by using the disclosed system and method, common data features across the datasets can be discovered while the name/designation of the common data features and their properties are kept unknown between the different entities. The system and method disclosed thus directly serves the privacy interests of different entities present in data colorations, such as a collaborative process in developing and training artificial intelligence (AI) models using shared datasets, thereby enabling AI applications that leverage datasets across entities without compromising and revealing private data items and information.

The exemplary implementations below rely on secure multiparty computation to achieve privacy protection while identifying common data features in datasets. Private information associated with datasets of one entity may be hidden from another entity during the multiparty communication by incorporating, for example, various secrete sharing schemes and encryption/decryption, such as homomorphic encryption and decryption. The exemplary implementations further employ a lexical database shared by the entities and developed using incremental learning, as well as various NLP techniques based on, for example, language embedding and morphological segmentation, to find possible associations between morphemes within datasets of the same entity and to assist in matching two similar data features in datasets across different entities, without revealing information about the datasets themselves, even though the feature name and description might not be identical.

FIG. 1 illustrates an exemplary computing system 100 for facilitating an identification of data feature intersection between datasets of different entities with privacy protection. The computing system 100 includes computing components 102 associated with Entity A and computing components in 104 associated with Entity B. Entity A and Entity B manage their private datasets A (103) and datasets B (105), respectively. These datasets may be consumed by various applications including but limited to applications involving artificial intelligence. The contents and the characteristics of the datasets A may not be revealed to Entity B. Likewise, the contents and the characteristics of the datasets B may not be revealed to Entity A.

The computing system 100 further includes computing components in 106 and 108 associated with one or more third-party facilitators or service providers for facilitating and provisioning various functionalities for the identification of intersection or overlap of data feature between datasets A and datasets B. The third-party facilitator or service providers may be an independent entity that provides key management, secret sharing, and smart contract service, as described in more detail below. Each of the computing components in 102, 104, 106, and 108 may be centralized or alternatively distributed across various geographic regions. The computing components in 102, 104, 106, and 108 may further communicate with one another via networks 110. The networks 110 may include any combination of wireless or wireline network components that are either publicly or privately accessible by the computing components in 102, 104, 106, and 108.

The computing system 100 may further include a shared database 120. As described in further detail, the shared database may be used to manage common data used by Entity A and Entity B. Such common data, for example, may include a lexical database. The shared database may be provisioned by any of the Entity A, Entity B, the third-party facilitator, and another entity not depicted in FIG. 1.

While only Entity A and Entity B are illustrated, the exemplary computing system 100 and the disclosure herein are not so limited. The principles underlying FIG. 1 and the various implementations described are extendable to include any number of entities for identifying intersection of datasets between any pair of two entities or any group of more than two entities among any number of entities without revealing data privacy. Likewise, there may be any number of third-party facilitators or service providers separately or jointly facilitating the identification of intersections of datasets.

Figure 2:
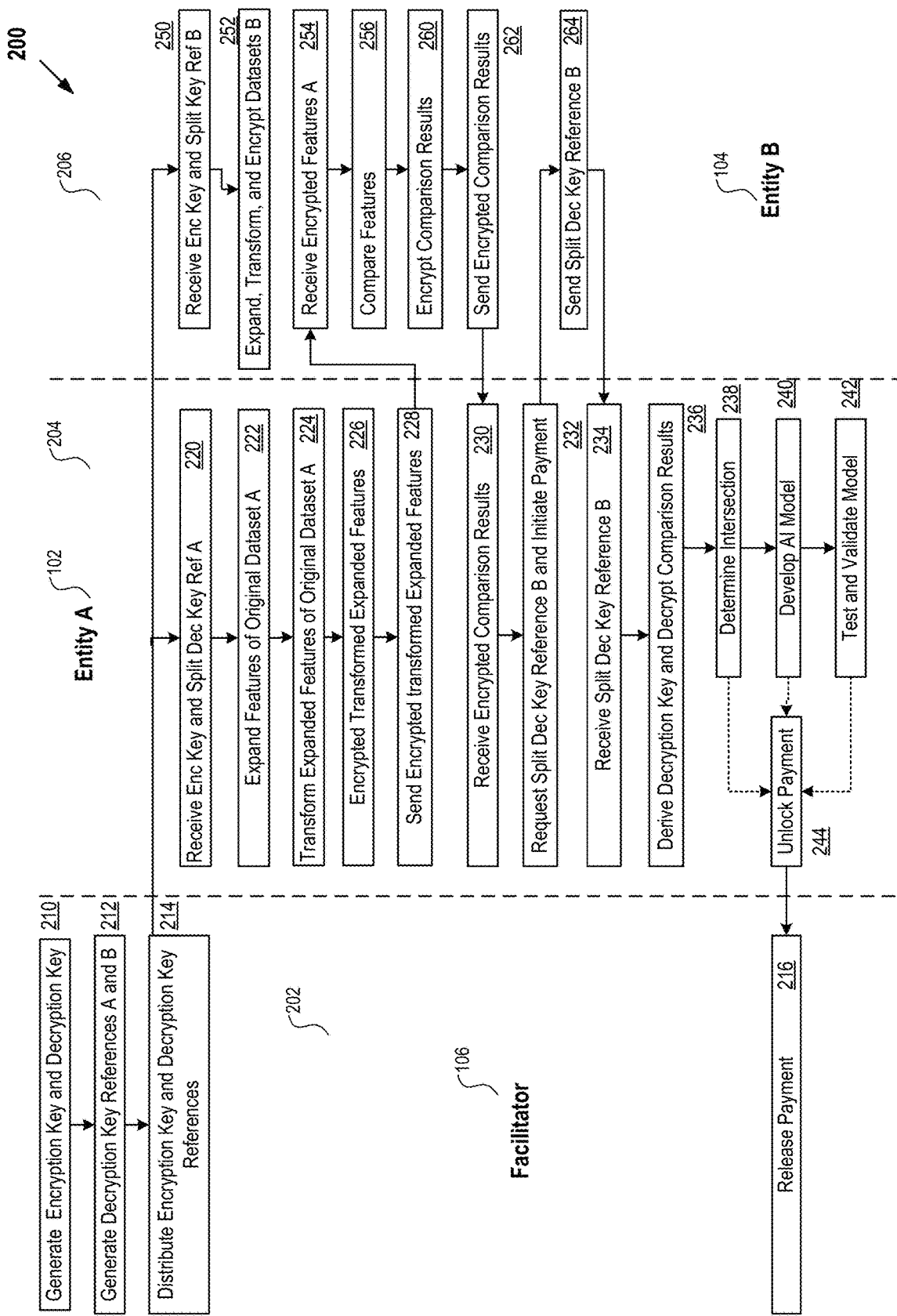
FIG. 2 illustrates an exemplary data processing logic flow for facilitating identification of data feature intersection between datasets of entity A and Entity B by a third-party facilitator.

FIG. 2 illustrates an exemplary data processing logic flow 200 for facilitating identification of data feature intersection between datasets of Entity A 102 and Entity B 104 by the third-party facilitator 106. In FIG. 2, data processing and logic flow within each of the Entity A 102, Entity B 104, and third-party facilitator 106 are respectively shown as columns 204, 206, and 202, as delineated by the dashed lines. Interactions between the Entity A 102, Entity B 104, and third-party facilitator 106 are shown by the arrows across columns 202, 204, and 206.

Among various technical components, the data processing logic flow 200 of FIG. 2 for identifying dataset overlap or intersection particularly relies on a homomorphic encryption for private information being communicated between the Entity A 102 and Entity B 104. The encryption and decryption keys may be provisioned, managed, and distributed by the third-party facilitator 106. To avoid inadvertent privacy leakage in the identification of data feature overlap or intersection between datasets in an example implementation, a Shamir secret sharing scheme may be applied to the decryption key. In this example, the decryption key for any homomorphically encrypted information may be coded in decryption key reference information items split between Entity A 102 and Entity B 104 as partial decryption key reference A and partial decryption key reference B, respectively. The decryption key can only be derived when both the partial or split decryption key reference A and partial or split decryption key reference B are available. Neither of the partial decryption key reference A or partial decryption key reference B alone is sufficient for decrypting the homomorphically encrypted data. As such, information that are homomorphically encrypted can only be decrypted by one of the Entities A and B when the other of Entities A and B shares its partial decryption key reference.

The homomorphic encryption may be based on any predefined homomorphic encryption algorithm known to both Entity A and Entity B. The use in this example of homomorphic encryption as oppose to other types of encryption is to allow for data processing in encrypted form in the data processing and logic flow 200 such that privacy in the datasets are not revealed to non-privy entities. In homomorphic encryption, a result of data processing of encrypted input data followed by decryption of the result may be identical to a result obtained by directly processing the unencrypted input data, provided that the encryption is homomorphic with respect to the data processing.

Turning to the steps of FIG. 2, the data processing logic flow 200 begins at the third-party facilitator 106 by preparation of keys and split key references for homographic encryption and decryption in steps 210-214. Specifically, in step 210, the third-party facilitator 106 generates an encryption key for homomorphically encryption of data and a corresponding decryption key for decryption of the homomorphically encrypted data. In step 212, the third-party facilitator 106 further generates split decryption key references A and B based on at least the decryption key. A further example for the generation of the split decryption key references A and B is given in elsewhere herein, in relation to at least FIG. 6. In essence, the split decryption key references A and B are generated in such a manner that the decryption key can only be derived when both the partial or split decryption key references A and B are known (an example derivation is provided in this disclosure) and each of these decryption key references by itself are insufficient to derive the decryption key. In step 214, the third-party facilitator 106 communicates the encryption key to both Entity A and Entity B; the third-party facilitator 106 further communicates the split decryption key reference A to Entity A 102 only and the split decryption key reference B to Entity B 104 only.

Next in the data processing logic flow 200 of FIG. 2, as shown in steps 220 and 250, Entity A 102 and Entity B 104 both receive and store the encryption key. Entity A 102 further receives and stores the split decryption key reference A whereas Entity B 104 further receives and stores the split decryption key reference B.

Once the key generation and distribution described above is complete, Entity A 102 and Entity B 104 may proceed to exchanging information for identifying intersections between their private datasets. The remaining steps of the data processing logic flow 200 are provided as an example for Entity A, as a requestor, to provide a set of features of its dataset in an encrypted manner to Entity B and for Entity B to perform computation on the received encrypted data features from Entity A and its own datasets to identify data features among its datasets that overlap with or intersect the dataset of requestor Entity A with respect to the set of data features and for Entity B to further communicate an indicator of the identified dataset overlap or intersection to the requestor Entity A.

The requestor Entity A 102 may possess a dataset that in its original form. The requestor Entity A 102 begins in step 222 by extracting features (such as textual data features or description data items) in an original dataset A privy to Entity A 102 and expanding the extracted features to generate a more complete description of the original data features. An example of such expansion of textual features based on lexical techniques and NLP is provided with relation to FIG. 4. In step 224, the requestor Entity A 102 may perform a transformation of the expanded data features of the original dataset A. Such transformation, for example, may include a numeration of the expanded data features into numbers for subsequent computation processes. A specific example of numeration is given below in more detail in relation to FIG. 5. The numericized expanded data features of Entity A may be alternatively referred to as a requestor dataset. In step 226, the requestor Entity A performs homomorphic encryption of the transformed expanded features based on the predefined homomorphic encryption algorithm and uses the encryption key received from the third-party facilitator 106 at step 220 to generate a listing of homomorphically encrypted requestor descriptors. Then at step 228, the requestor Entity A 102 sends a request for Entity B 104 to perform dataset intersection identification by communicating the encrypted transformed expanded data features of the dataset A (alternatively referred to as the listing of homomorphically encrypted requestor descriptors) to Entity B. Entity B correspondingly receive the encrypted transformed expanded data features of the dataset A at step 254.

Likewise, Entity B may perform similar extraction of data features of its various own datasets, and then expand and transform these data features in step 252. The transformed expanded features of datasets of Entity B may be referred to as comparer datasets as they are to be compared to the listing of encrypted requestor descriptors from Entity A. Upon receiving the request from Entity A with the encrypted transformed expanded data features of dataset A (the encrypted requestor descriptors) at step 254, Entity B may then performed a comparison computation between the encrypted transformed expanded data features of dataset A (the encrypted requestor descriptors) and the transformed expanded data features of datasets B (the comparer dataset). The comparison computation may be performed with the transformed expanded data features of datasets B either unencrypted or encrypted using the homomorphic encryption algorithm and the encryption key received by Entity B at step 254. Comparison results in the form a data feature overlapping or intersection indicator (alternatively referred to as a list-matching indicator) may then be encrypted using the homomorphic encryption algorithm and the encryption key at step 260. The list-matching indicator indicates an overlap or intersection between the expanded features of in dataset A and dataset B. Entity B may then send the encrypted comparison results or the encrypted data feature overlapping/intersection indicator (alternatively referred to as an encrypted list-matching indicator) to Entity A at step 262. Entity A correspondingly receives the data feature comparison results/intersection at step 230.

Upon receiving the encrypted comparison results or the encrypted data feature overlapping/intersection indicator at step 230, Entity A begins a decryption process. Entity A starts by requesting the split decryption key reference B from Entity B at step 232. In response, Entity B may send the split decryption key reference B at step 262. At step 234, Entity A receives the split decryption key reference B from entity B. At step 236, Entity A then performs a derivation of the decryption key based on the split decryption key reference B received from Entity B and the split decryption key reference A received from the third-party facilitator 106 at step 220. Once the decryption key is derived, Entity A proceeds to decrypt the encrypted comparison results or the encrypted data feature overlapping/intersection indicator at step 236. At step 238, Entity A determines the data feature intersection. At step 240, Entity A utilizes the data feature intersection information to perform, for example, development of an AI model, which may be based on the intersecting datasets of Entity B that may be homomorphically encrypted before being used by Entity A as training data. Such homomorphic encryption allows for training of the AI model without knowledge of the actual training datasets. The decryption key for such homomorphic encryption by Entity B may be different from the homomorphic decryption key used above for the data feature intersection processing such that Entity A is prevented from being able to decrypt the encrypted actual intersecting datasets (The decryption key derived by Entity A cannot be used to decrypt homomorphically encrypted datasets for training).

Figure 3:
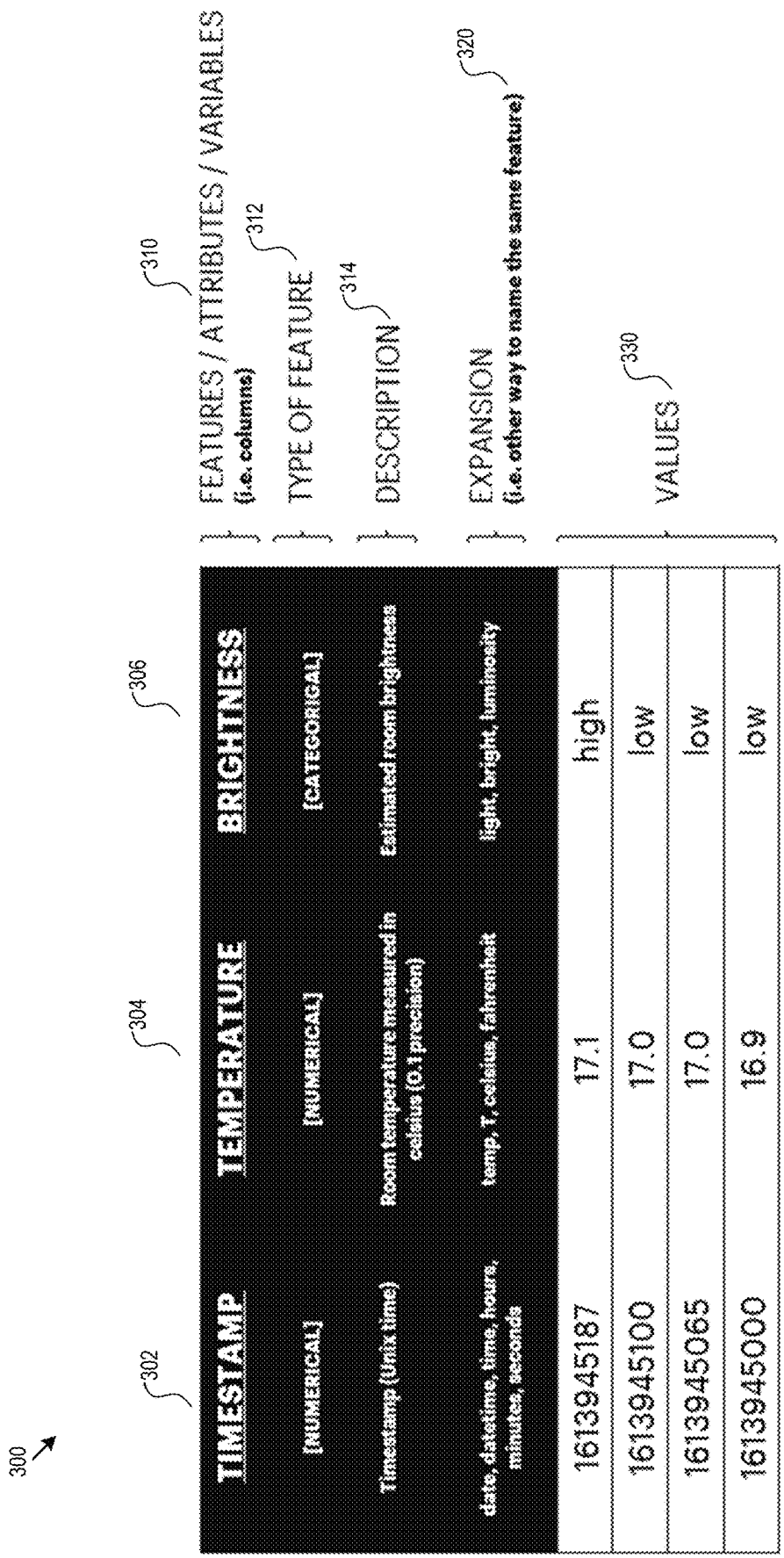
FIG. 3 illustrates an exemplary private dataset of entity A of FIG. 2.

The data processing and logic flow 200 of FIG. 3 may be further arranged to facilitate charging of computational cost and payment provisioning, as exemplified by steps 232-244 and 216. Specifically, because the data feature intersection request is made by Entity A and the major intensive computation, however, may be performed by Entity B including, for example, in steps 256 and 260 (large amount datasets in some situations), the computational expense by Entity B may be paid by Entity A. As such, in step 232, a payment transaction by Entity A may be initiated when the data feature intersection identification request is made by Entity A. Further, Entity B may only provide its split decryption key reference B to Entity A if such payment transaction is indeed initiated. To further protect the interest of entity A, such payment transaction may be placed on hold until Entity A can validate that the computation made by Entity B is legitimate. Upon successful validation, Entity A may then instruct for release of the payment at step 244 (which is illustrated in FIG. 2 as being performed by the third-party facilitator, but that is not so limited).

The payment initiation, withholding, and release transactions may be handled through a smart contract implemented in a public ledger system in a blockchain platform. These transactions may be provisioned by the third-party facilitator 106. Alternatively, these transactions may be handled by another independent third-party service provider. In some other implementations, these transactions may be provided via a secure software platform, such as Intel's Software Guard Extension (SGX) platform.

Validation of the legitimacy of the comparison results sent from Entity B to Entity A in step 262 may be performed by Entity A in various manners. For example, Entity A may receive the split decryption key reference B and the comparison results from Entity B, decrypt the comparison results, and determine whether Entity B is legitimate by developing AI models based on the decrypted comparison results and determining whether the resulting AI models satisfy a predictive accuracy threshold.

FIGS. 3-6 are explained below to further illustrate exemplary implementations of the various data processing steps of FIG. 2. For example, FIG. 3 illustrates a private dataset A 300 of entity A of FIG. 2. The exemplary dataset 300 reflects measurements performed over several environmental parameters of an indoor setting. The original dataset A may include data columns shown as 302, 304, and 306 corresponding to time sequences of temperature and brightness measurements. Row 310 of the original dataset A, for example, indicates the data features/attributes/variables being measured for each of the data columns. Row 312 indicates the type or category of data in each of the columns. Data items in row 312 may or may not be present in the original dataset A. If not presented in the original dataset A, the data features/attributes/variables may nevertheless be derived automatically based on the nature of the data values 330 in each of the data columns (e.g., based on whether these values are textual or numerical). Row 314 may include textual or other types of textual description of each of the data columns. Row 314 may be included as part of the original dataset A. Row 314 represents an expansion of the data features in, for example, row 310. As will be described in more detail below in relation to FIG. 4, such expansion may not be present in the original dataset A. Instead, information in other rows such as the data feature row 310, the category row 312 and the description row 334 may be analyzed to generate the expanded data features. This expansion process corresponds to steps 222 and 252 of FIG. 2. Such expansion generates a broader list of feature designations for each of the data columns and provides more accurate representation of the data features. In FIG. 3, actual values of the dataset 300 is shown in 330.

Figure 4:
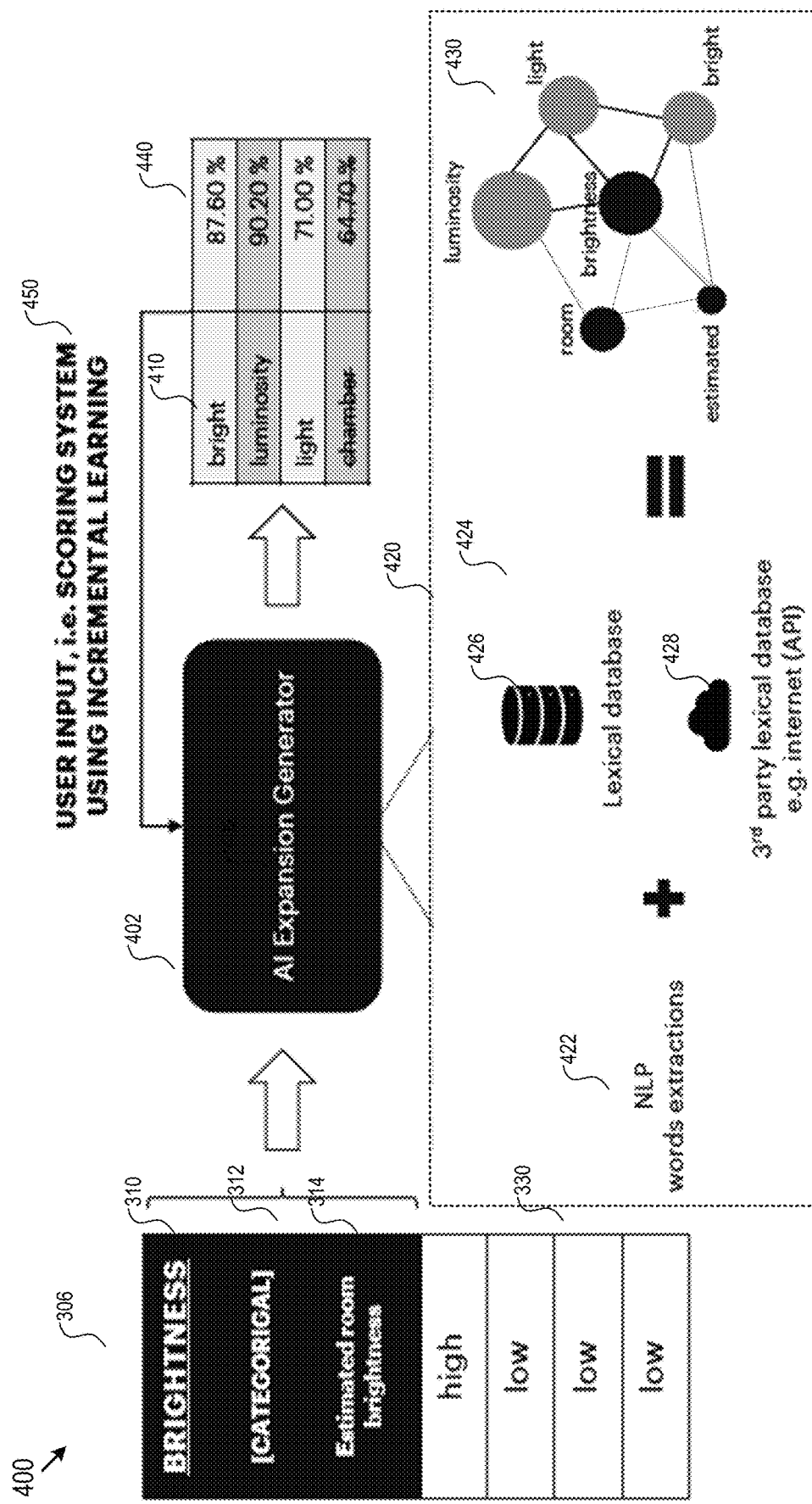
FIG. 4 illustrates an exemplary process for expanding data features in the private dataset of FIG. 3.

FIG. 4 illustrates the data feature expansion process 400 described above in relation to row 320 of FIG. 3 and steps 222 and 252 of FIG. 2. The input to the expansion process for the exemplary data column 306 of FIG. 3 and FIG. 4 may include the data features 310, categorical information 312, and the description 314. Such input may be provided to an AI expansion generator or engine 402 for generating the expanded feature list 410. The expanded feature list 410 includes additional features that are also descriptive of the data feature characteristics in the original data column 306.

An example for the inner workings of the AI expansion generator 402 is shown in 420. The example implementation 420 may be based on NPL extraction 422 and lexical expansion process 424. Specifically, NLP techniques may be used to segment and extract words or phrases from the original dataset. For example, the extracted words/phrases in this case may include "brightness", "room", and "estimate". The lexical expansion process 424 of the extracted words/phrase via NPL may be based on, for example, lexical database 426 that are maintained and shared by Entity A 102, Entity B 104, and the third-party facilitator 106. The lexical expansion may be further based on other third-party lexical databases 428. The lexical databases 426 and 428 provide a collection of domain specific vocabulary that qualifies relevance of various domain-specific words/phrases. For example, each word/phrase may be characterized in the lexical databases by its popularity and its connectivity to other words or phrases, as shown in 430 of FIG. 4. The popularities of words and connectivity between words in the lexical databases 426 and 428 may be pretrained using known domain specific datasets.

As shown in 430 of FIG. 4, via the lexical expansion process 424, words and phrases representing an expansion from the data features in the original dataset may be identified according to their popularities and their connectivity to the words/phrases extracted from the original data features of the original dataset. In accordance, the lexical databases may be stored and managed as a graph with nodes and edges representing words/phrases and their connectivity, as shown in 430. The identification of the expanded words/phrases may be based on scores computed using a predefined scoring function that depends on popularities and connectivity. The score for a word or phrase, for example, may be normalized to between 0 and 1 (or between 0 and 100%), representing how well the word or phrases matches the original data features in the Dataset A. In some implementations, the score function may incorporate one or more parameters that can be input by users while the AI expansion generator 402 is deployed to provide an incremental learning such that the accuracy in computing the scores of words/phrases improves as the AI expansion generator 402 is being used. As an example, the score function representing similarity of one word/phrase to another may be implemented as a sigmoid function:

$$S = \frac{1}{1+e^{-x}}$$

where $x=cw_c+p$, in which "c" represents connectivity, and "p" represents popularity, and "$w_c$" represents user weight parameter. The user weight parameter $w_c$ may be learned according user input (e.g., rejecting a recommendation for expanded word or phrase by a user) via incremental learning while the AI expansion generator 402 is being used. In some implementations of the incremental learning, the weight parameter $w_c$ may be obtained and updated by optimizing the scoring function above. Specifically, the score function S returns a value between 0 and 1 and corresponds to the score (a percentage if multiplied by 100) for a particular word. When the user weight parameter is adjusted (by the user validating/rejecting a recommendation or by popularity changes because it is context based and can be updated, the output of S changes. The user inputs over time affect and adjust the weight parameters which affect the output provided by the function, thereby yielding a user input based incremental learning.

As shown in the example of FIG. 4, the originally specified data features of column 306 includes "brightness" and the original description of the data column recites "Estimated room brightness". After expansion by the AI expansion engine 402, the expanded list of data features 410 may include, for example, "bright", "luminosity", "light", and "chamber," each associated with a score in 440. A score threshold may be predefined or may be definable by users such as Entity A via a user interface (e.g. 70%, or any other percentage depending on the application circumstances), and words/phrases with scores higher than the score threshold may be included in the final expanded list of data features whereas words/phrases with scores lower than the threshold may be removed from the list. Users may be prompted to confirm the recommendation of the list of expanded data features, as shown by 450. For example, users may remove some of the recommended words/phrases or promote some of the removed words/phrases. Such user input may be further incorporated into the incremental learning process described above to update the weight parameters above.

Figure 5:
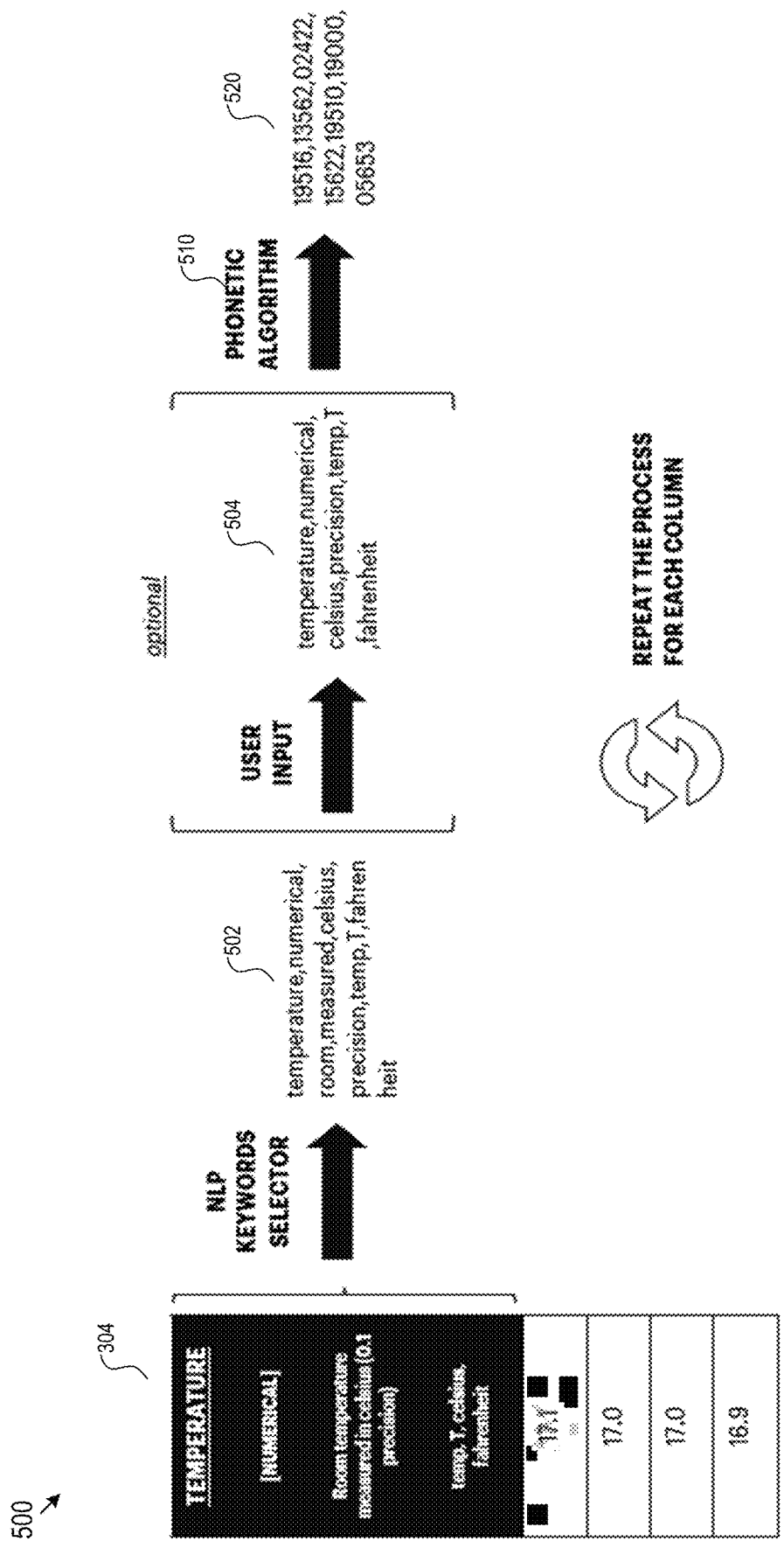
FIG. 5 illustrates an exemplary transformation process to numericize the expanded data features of FIG. 4.

As shown in steps 224 and 252, the expanded data features of dataset A may be further transformed into a form suitable for homomorphic encryption and computation. An exemplary implementation of such transformation process is further illustrated in 500 of FIG. 5. As shown in FIG. 5, column 304 of the original dataset A is first processed using NLP techniques for words extraction and the AI expansion engine 402 for word expansion to generate a list of expanded features 502. The list of features 502 may further be vetted by the user to generate a final list of expanded features 504. The transformation 510 may then be performed on the final list of data features 504 to generate a transformed (numericized, as described further below) feature list 520.

In some exemplary implementations, the final list of expanded data features may be textual and the transformation may be based on a phonetic algorithm to transform the textual features into numerical values, such as integers, as shown in 510 and 520 of FIG. 5. In some implementations, the numerical values may be bound. For example, for some particular phonetic algorithm, the integer numerical values may be bound between 0 and 25999. The two leading digits, for example, may be correlated with the starting character of the word among the 26 alphabetic letters. While only one data column is illustrated in FIG. 5, the transformation above may be repeated for each data column of the input dataset A.

Figure 6:
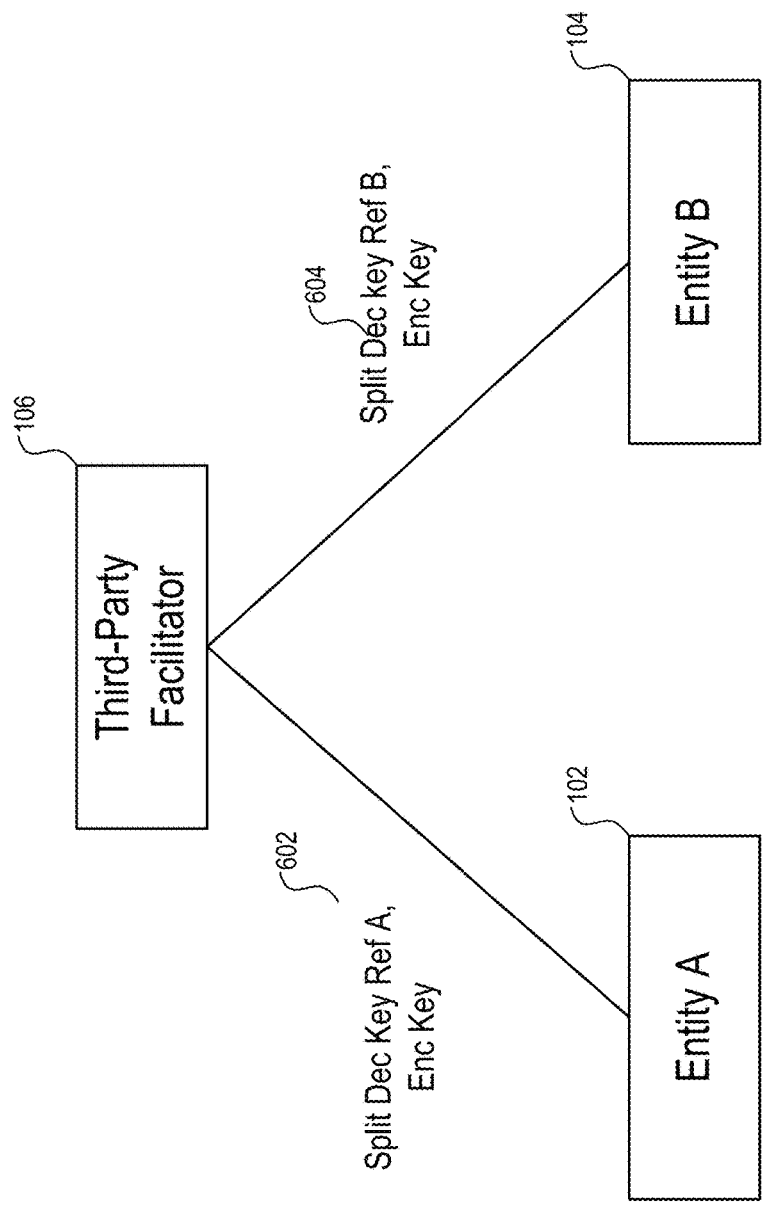
FIG. 6 illustrates an exemplary encryption and decryption key distribution by the third-party facilitator according to FIG. 2.

FIG. 6 illustrates the encryption/decryption key generation and splitting of decryption key using any secrete sharing and encoding scheme. Merely as an example, a Shamir's secret sharing and encoding scheme is described in further detail below. Shamir's secret sharing scheme is a cryptographic algorithm that allows private information, "secrets", to be distributed securely amongst an untrusted network. In cryptography, secret sharing represents a way to securely distribute segments of private information to a distributed network or group.

Secret sharing in general, and Shamir's secrete sharing in particular, work by splitting private information into pieces or shares. The split information may then be distributed to different entities (Entity A and Entity B in the examples above). Each individual piece is useless on its own but when all the shares are combined, they can reconstruct an original secret.

As shown in FIG. 6, Shamir's secret sharing is applied in this disclosure to the decryption key for the homomorphic encryption/decryption. Specifically, as shown by 602 and 604 of FIG. 6, the encryption key may be distributed in whole to each of the Entity A 102 and Entity B 104 whereas the decryption key may be processed and split by the third-party facilitator into two pieces, the split decryption references A and B, which are distributed as secret to Entity A and Entity B, respectively.

In some specific exemplary implementations as employed in steps 210-214 of FIG. 2, the third-party facilitator 106 generates the encryption key and the decryption key. The third-party facilitator 106 then splits the decryption key using Shamir's secret sharing by constructing a degree-one polynomial function (a linear function) using the encryption key and a random number, and then generates two random points of the linear function for sharing between Entity A and Entity B. Each random point corresponds to a pair of coordinates of the linear function. As such, each of Entity A and Entity B would be provided the encryption key and one of two random points each containing partial information about the decryption key. Each of the Entity A and Entity B would not know or be able derive the entire decryption key without having access the other random point distributed to the other entity. The two entities can both use the distributed encryption key for encrypting their datasets, and also exchange with each other the encrypted datasets. They can also perform computation on their encrypted dataset (developing features or models) as a result of homomorphic encryption properties. In other words, the output of the computation based on the encrypted datasets, once decrypted, would be identical to the same computation performed on unencrypted dataset. The exchange of the encrypted data or computation results belonging to one entity would not reveal the actual datasets or computation results as long as each entity keeps their points secret so that there is no way for the other entity to decrypt the shared datasets or computation results.

As an exemplary illustration of the Shamir's secret sharing scheme, the decryption key is assumed to be 1234. A random number may be selected, e.g., 166, to construct a linear function:

$$f(x)=123+166x.$$

Two random points may be further selected by the third-party facilitator 106 as two different split decryption key references:

$$S_A=(1,f(1))=(1,1400); \text{ and}$$

$$S_B=(2,f(2))=(2,1566).$$

The third-party facilitator 106 may then distribute the random point $S_A$ to Entity A and the random point $S_B$ to Entity B. Each of these random points by itself is not sufficient for reconstructing the original secret linear function $f(x)$. An entity can only reconstruct the secret linear function $f(x)$ and thus retrieve the decryption key when provided with the other split decryption key reference.

In some applications, the homomorphic decryption key may be long for enhanced protection. For such a long decryption key, rather than generating a single linear function to encode the decryption key, the third-party facilitator 106 may instead break the long decryption key into segments, and generate a different linear function for each segment. The Shamir's secret sharing scheme above may then be applied for each of the segments of the decryption key. As such, rather than a single linear function, multiple consecutive linear functions may be generated. Two random points may be selected for each of the linear functions and split-shared to Entity A and Entity B. As a result, each of the entities would hold multiple random points, each for one of the multiple linear functions.

For example, assume that the long decryption key is "d2h5ZGIkeW91ZGVjb2RIdGhhdD8," which corresponds to [75463, 85947, 54875, 25165 . . . ] in a segmented integer representation. Following the Shamir's secret sharing scheme above, a linear function may be constructed for each of these integer segments of the decryption key along with a random number, and with two random points selected:

$$f_1(x)=75463+9864x \text{ with } S_{11}(46,f_1(46)) \text{ and } S_{21}(2,f_1(2))$$

$$f_2(x)=85947+594x \text{ with } S_{12}(7,f_2(7)) \text{ and } S_{22}(15,f_2(15))$$

. . .

The principles of split decryption key references described above apply to each of the decryption key segment.

For the exemplary implementation above as applied to step 236 of FIG. 2, an entity may retrieve the decryption key as descripted below when all split decryption key references are made available. Assuming again a short decryption 1234 key, that $f(x)=1234+166x$, and that $S_A=(1, f(1))=(1,1400)=(x_0,y_0)$, and $S_B=(2, f(2))=(2,1566)=(x_1,y_1)$, the Lagrange basis polynomials may be computed as follows:

$$I_0(x)=(x-x_1)/(x_0-x_1)=2-x$$

$$I_1(x)=(x-x_0)/(x_1-x_0)=x-1.$$

The fandom function f(x) may be reconstructed with $S_A$ and $S_B$ as:

$$f(x)=y_0*I_0(x)+y_1*I_1(x)=1400*(2-x)+1566*(x-1)$$
$$=1234+166x$$

The decryption key 1234 may thus be retrieved. Retrieval of a long decryption key may follow the same principles, by separately recovering each key segment when both random points are made available for each key segment.

Figure 7:
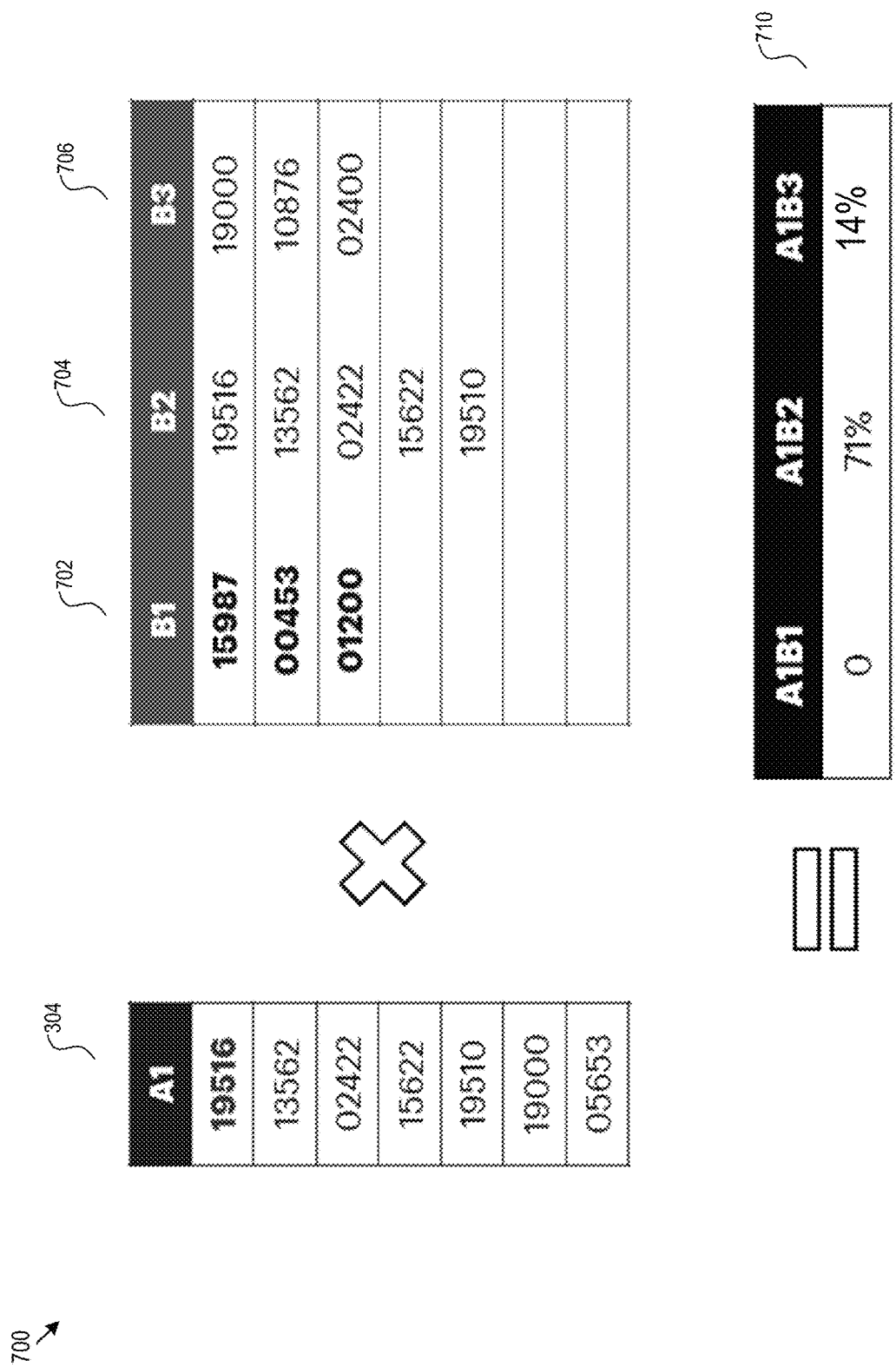
FIG. 7 illustrates an exemplary process for generating a data feature matching indicator that identifies a list of intersections of data features between the private dataset of entity A of FIG. 3 and private datasets of entity B.

FIG. 7 further illustrates an exemplary implementation for performing computation 700 to identify overlap or intersection between data features of datasets of different entities while maintaining privacy. Such exemplary implementation may be applied to steps 256 and 260 of FIG. 2.

As shown by the example in FIG. 7, the data feature overlap or intersection between the numericized expanded data features of column 304 of dataset A of Entity A and the numericized expanded data features of columns 702, 704, and 706 of dataset B of Entity B may be computed as described below. The numericized features 304 may be homomorphically encrypted before it was sent over from Entity A to Entity B for computation such that the specifics of the data features of column 304 is not revealed to Entity B. The homomorphic encryption algorithm may be represented by δ ( ) and the homomorphically encrypted data feature column 304 of Entity A may be correspondingly represented as $\delta(A_{10} \ldots A_{1n})$. While FIG. 7 illustrates expanded data features of a single data column of Entity A, data features of more than one data column can be sent to Entity B for identifying overlapping or intersecting data columns of datasets of Entity B for each of the more than one data column of Entity A.

In the Example of FIG. 7, the numericized expanded data features from the requestor Entity A may be represented by A1. The numericized expanded data features of the three example data columns from Entity B for comparison may be represented by B1, B2, and B3. For each of the B1, B2, and B3, Entity B may perform computation to quantify its overlapping or intersection of data features with A1. In some exemplary implementations, for column B1, Entity B may first subtract encrypted or non-encrypted B1 with each value in A1 and then multiple these differences together:

$$[B_{10}-\delta(A_{10})]*[B_{11}-\delta(A_{10})]*[B_{12}-\delta(A_{10})];$$

$$[B_{10}-\delta(A_{11})]*[B_{11}-\delta(A_{11})]*[B_{12}-\delta(A_{11})];$$

$$[B_{10}-\delta(A_{12})]*[B_{11}-\delta(A_{12})]*[B_{12}-\delta(A_{12})];$$

. . .

$$[B_{10}-\delta(A_{16})]*[B_{11}-\delta(A_{16})]*[B_{12}-\delta(A_{16})];$$

Or $$[\delta(B_{10})-\delta(A_{10})]*[\delta(B_{11})-\delta(A_{10})]*[\delta(B_{12})-\delta(A_{10})];$$

$$[\delta(B_{10})-\delta(A_{11})]*[\delta(B_{11})-\delta(A_{11})]*[\delta(B_{12})-\delta(A_{11})];$$

$$[\delta(B_{10})-\delta(A_{12})]*[\delta(B_{11})-\delta(A_{12})]*[\delta(B_{12})-\delta(A_{12})];$$

. . .

$$[\delta_{(B_{10})} - \delta_{(A_{16})}] * [\delta_{(B_{11})} - \delta_{(A_{16})}] * [\delta_{(B_{12})} - \delta_{(A_{16})}].$$

In the computation above, each multiplication product corresponds to one of the multiple data feature elements of column A1. These multiplication products may be referred to as numerical matching values. A non-zero numerical matching value indicates that the corresponding data features in A1 is found (or matched) in B1. The series of multiplication products above thus form an indicator of dataset overlap and intersection in terms of data features between each data feature of Entity A and data column B1 of Entity B. Similar multiplication product sequences for indicating overlapping between each data feature of Entity A and data columns B2 and B3 may also be computed. These product sequences then collectively form a multiplication product array as an overlapping or intersection indicator represented by {Intersection} for indicating the overlap/intersection between each data features of column A of entity A with each of the columns B1, B2 and B3 of entity B. The intersection indicator {Intersection} may be further homomorphically encrypted into $\delta(\{\text{Intersection}\})$ by Entity B before being sent to Entity A.

The {intersection} or the $\delta(\{\text{Intersection}\})$ after decryption may be used to quantify overlap or intersection between column A1 and columns B1, B2, and B3. Specifically, the extent to which column A1 and B1 intersect may be represented by calculating a percentage of non-zero values of the multiplication products involving A1 and B1 above. The extent to which columns A1 and B2 overlap in terms of data features and the extent to which column A1 and B3 overlap in data features can be similarly computed, as shown by 710 of FIG. 7.

The encrypted indicator array $\delta$ {Intersection} may be decrypted by Entity A by first requesting the split decryption key reference B distributed by the third-party facilitator 106 to Entity B 104 and then reconstructing the decryption key as described above. After performing decryption to obtain the array {Intersection}, Entity B my then count the non-zero value percentages to determine the extent to which A1 intersects B1, B2, or B3 in terms of data features. Entity A may further establish a matching threshold percentage value for determining whether data column A is considered similar to the columns B1, B2, or B3. For example, the matching threshold value may be set at 70%, and based this threshold value, A1 may be considered similar to B2, but not B1 or B3 may not be considered similar to A1 according to the specific exemplary percentage values in 710 of FIG. 7. Entity A 102 may adjust this matching threshold value by checking an effectiveness of utilization of the data columns that are deemed similar. For example, Entity A may increase the matching threshold if an A1 model developed based on datasets determined as similar using a particular matching threshold values does not achieve a particular predicative accuracy or other performance criteria.

In some implementations, the order of product elements in each of the multiplication product series above may be scrambled by Entity B before being encrypted and sent to Entity A. As such, particularities as to which ones of the data features of A1 intersect that of columns B1, B2, or B3 may be hidden from Entity A when it is desirable to keep information at such a specific level away from Entity A.

The various implementations above may be expanded to more than two entities. Dataset overlap and intersection identification between any of the two entities of the more than two entities may be determined using the same underlying principles described above.

In some other implementations involving, for example, three entities, the third-party facilitator may split the decryption key references three-ways. For example, rather than using a linear function, a second-degree polynomial (quadratic function) parameterized by the decryption key and two other random numbers may be used for three entities. Three split decryption key references may be generated using three random points of the quadratic functions. Each of the three random points may be used as a split reference and sent to each of the three entities. The decryption key may be retrieved when all three random points are known. Such scheme can be further expanded to higher order polynomials and larger number of split decryption key references.

Figure 8:
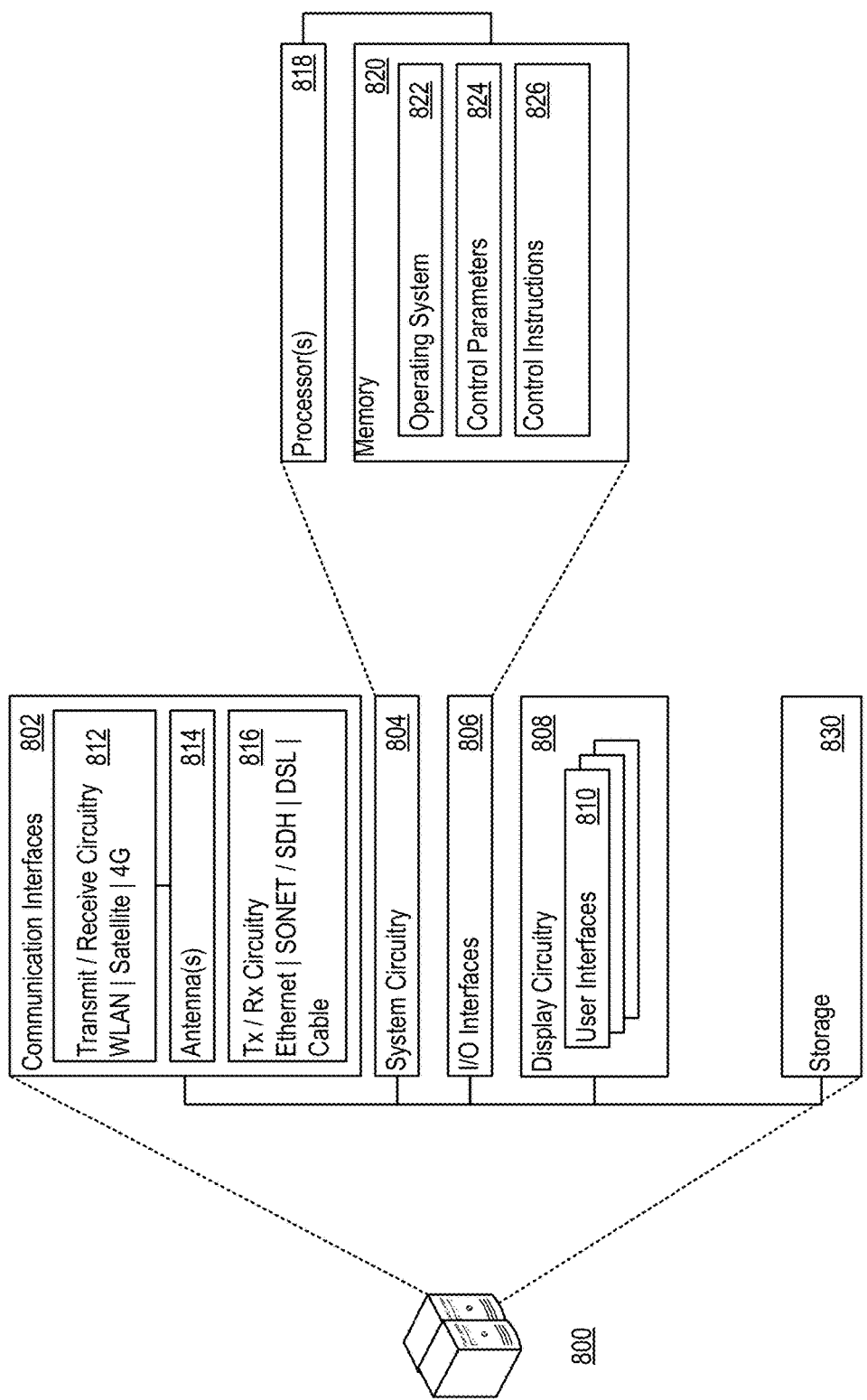
FIG. 8 illustrates an exemplary computing device that may be used to implement various computing components of the systems described.

Finally, FIG. 8 illustrates an exemplary architecture of a computing device 800 on which the various computing components of the system of FIG. 1 may be implemented. The computing device 800 may include communication interfaces 802, system circuitry 804, input/output (I/O) interface circuitry 806, and display circuitry 808. The graphical user interfaces (GUIs) 810 displayed by the display circuitry 808 may be used to receive user commands/input and to display various outputs. The GUIs 810 may be displayed locally using the display circuitry 808, or for remote visualization, e.g., as HTML, JavaScript, audio, and video output for a web browser running on a local or remote machine. Among other interface features, the GUIs 810 may further render displays of visual representations of various datasets, data features, and their intersection.

The GUIs 810 and the I/O interface circuitry 806 may include touch sensitive displays, voice or facial recognition inputs, buttons, switches, speakers and other user interface elements. Additional examples of the I/O interface circuitry 806 includes microphones, video and still image cameras, headset and microphone input/output jacks, Universal Serial Bus (USB) connectors, memory card slots, and other types of inputs. The I/O interface circuitry 806 may further include magnetic or optical media interfaces (e.g., a CDROM or DVD drive), serial and parallel bus interfaces, and keyboard and mouse interfaces.

The communication interfaces 802 may include wireless transmitters and receivers ("transceivers") 812 and any antennas 814 used by the transmit and receive circuitry of the transceivers 812. The transceivers 812 and antennas 814 may support WiFi network communications, for instance, under any version of IEEE 802.11, e.g., 802.11n or 802.11ac, or other wireless protocols such as Bluetooth, WiFi, WLAN, cellular (4G, LTE/A). The communication interfaces 802 may also include serial interfaces, such as universal serial bus (USB), serial ATA, IEEE 1394, lighting port, $I^2C$, slimBus, or other serial interfaces. The communication interfaces 802 may also include wireline transceivers 816 to support wired communication protocols. The wireline transceivers 816 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 804 may include any combination of hardware, software, firmware, APIs, and/or other circuitry. The system circuitry 804 may be implemented, for example, with one or more systems on a chip (SoC), application specific integrated circuits (ASIC), microprocessors, discrete analog and digital circuits, and other circuitry. The system circuitry 804 may implement any desired functionality of the disclosed system and its various components. As just one example, the system circuitry 804 may include one or more instruction processor 818 and memory 820.

The memory 820 may be implemented as a non-transitory memory circuit and may store, for example, control instructions 822 for implementing the various functions described above, as well as an operating system 821. In one implementation, the processor 818 executes the control instructions 822 and the operating system 821 to carry out any desired functionality for identifying dataset overlap and intersection.

The computing device 800 may further include various data sources 830, or may be in communication with external data sources. Each of the databases that are included in the data sources 830 may be accessed by the various component of the disclosed system and its components. The data source 830, for example, may host the lexical database and the various datasets described above.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

We claim:

1. A system comprising:
   a memory circuitry for storing computer instructions;
   a network interface circuitry; and
   a processor in communication with the network interface circuitry and the memory circuitry, the processor configured to execute the computer instructions to:
   receive an encryption key and a first partial decryption key reference corresponding to the encryption key;
   encrypt a requestor dataset using the encryption key and using a predefined homomorphic encryption algorithm to generate a listing of homomorphically encrypted requestor descriptors;
   send the listing of homomorphically encrypted requestor descriptors to a data source;
   receive, from the data source, a list-matching indicator encrypted using the predefined homomorphic encryption algorithm indicating an overlap between the requestor dataset and a comparer dataset at the data source;
   request and receive a second partial decryption key reference corresponding to the encryption key from the data source;
   generate a decryption key corresponding to the encryption key from the first partial decryption key reference and the second partial decryption key reference;
   decrypt the list-matching indicator that is homomorphically encrypted to generate a decrypted list-matching indicator using the decryption key; and
   identify a subset of data items of the comparer dataset as matching the requestor dataset according to the decrypted list-matching indicator.

2. The system of claim 1, wherein:
   the decryption key comprises one or more decryption key segments each re-constructible from one of one or more multi-point decryption key functions corresponding to the one or more decryption key segments using multiple reference points; and
   the first partial decryption key reference and the second partial decryption key reference comprises one or more first reference points corresponding and one or more second reference points corresponding to the one or more multi-point decryption key functions, respectively.

3. The system of claim 2, wherein each of the multi-point decryption key functions comprises a random number and a first-degree polynomial function parameterized by a corresponding one of the one or more decryption key segments.

4. The system of claim 3, wherein, to generate the decryption key, the processor is configured to execute the computer instructions to compute Lagrange basis polynomials using the first partial decryption key reference and the second partial decryption key reference for each of the one or more decryption key segments.

5. The system of claim 1, wherein, to generate the requestor dataset, the processor is further configured to execute the computer instructions to:
   retrieve an original requestor dataset corresponding to the requestor dataset;
   extract textual data features or description data items from the original requestor dataset;
   expand the textual data features or description data items to include additional words or phrases; and
   generate the requestor dataset by numericizing the expanded textual data features or description data items.

6. The system of claim 5, wherein the additional words or phrases are identified according to the textual data features or description data items and a lexical database common to the system and the data source.

7. The system of claim 6, wherein:
   the lexical database comprises a plurality of words or phrases each characterized by its popularity and a plurality of numerically quantified connections between the plurality of words or phrases; and
   wherein the additional words or phrases are identified by selection from the plurality of words and phrases in the lexical database having a sum of popularity and weighted connection to the textual data features or description data items over a predetermined threshold value.

8. The system of claim 7, wherein the popularity of the words and phrases and weighted connection therebetween in the lexical database is configured to evolve via incremental learning.

9. The system of claim 5, wherein the expanded textual data features or description data items is numericized by applying a predefined phonetic algorithm.

10. The system of claim 5, wherein the comparer dataset is generated at the data source by:
retrieving an original comparer dataset;
extracting textual data features or description data items from a data column of the original comparer dataset;
expanding the textual data features or description data items of the original comparer dataset to include additional words or phrases; and
generating the comparer dataset by numericizing the expanded textual data features or description data items of the original comparer dataset.

11. The system of claim 10, wherein:
the list-matching indicator, prior to being encrypted at the data source using the predefined homomorphic encryption algorithm, comprises one or more numerical matching values each indicating a degree of matching between data of the comparer dataset and the listing of homomorphically encrypted requestor descriptors; and
each of the one or more numerical matching values is generated at the data source by:
calculating numerical differences between each of data values of the listing of homomorphically encrypted requestor descriptors and the data column of the comparer dataset; and
obtaining a numerical product of the numerical differences.

12. The system of claim 11, wherein the comparer dataset is unencrypted prior to generating the one or more numerical matching values.

13. The system of claim 12, wherein the processor is configured to execute the computer instructions to identify the subset of data items of the comparer dataset as matching the requestor dataset by:
identifying non-zero values among the one or more numerical matching values; and
identifying data columns in the comparer dataset having a percentage of non-zero values above a predetermined matching percentage threshold as the subset of data items of the comparer dataset as matching the requestor dataset.

14. The system of claim 1, the processor is further configured to execute the computer instructions to:
initiate a transaction to the data source using a blockchain smart contract or based on a software guard extension (SGX) when sending the listing of homomorphically encrypted requestor descriptors to the data source;
hold the transaction in the blockchain smart contract or the SGX until the encrypted list-matching indicator received from the data source is validated or until a predetermined time period following receipt of the encrypted list-matching indicator; and
release the transaction for payment in the blockchain smart contract or the SGX after the encrypted list-matching indicator received from the data source is validated or after the predetermined time period following receipt of the encrypted list-matching indicator.

15. The system of claim 14, the processor is configured to validate the received encrypted list-matching indicator by:
developing an artificial intelligence model trained using a homomorphically encrypted version of the subset of data items of the comparer dataset; and
validating the received encrypted list-matching indicator based on a predictive accuracy of the trained artificial intelligence model being above a predetermined accuracy threshold.

16. A privacy-protecting data-sharing method comprising:
receiving an encryption key and a first partial decryption key reference corresponding to the encryption key;
generating a listing of homomorphically encrypted requestor descriptors by encrypting a requestor dataset using the encryption key and using a predefined homomorphic encryption algorithm;
sending the listing of homomorphically encrypted requestor descriptors to a data source;
receiving a list-matching indicator encrypted using the predefined homomorphic encryption algorithm from the data source indicating an overlap between the requestor dataset and a comparer dataset at the data source;
requesting and receiving a second partial decryption key reference corresponding to the encryption key from the data source;
generating a decryption key corresponding to the encryption key from the first partial decryption key reference and the second partial decryption key reference;
decrypting the list-matching indicator that is homomorphically encrypted to generate a decrypted list-matching indicator using the decryption key; and
identifying a subset of data items of the comparer dataset as matching the requestor dataset according to the decrypted list-matching indicator.

17. The method of claim 16, wherein:
the decryption key comprises one or more decryption key segments each re-constructible from one of one or more multi-point decryption key functions corresponding to the one or more decryption key segments using multiple reference points; and
the first partial decryption key reference and the second partial decryption key reference comprises one or more first reference points corresponding and one or more second reference points corresponding to the one or more multi-point decryption key functions, respectively.

18. The method of claim 16, wherein generating the requestor dataset, comprises:
retrieving an original requestor dataset corresponding to the requestor dataset;
extracting textual data features or description data items from the original requestor dataset;
expanding the textual data features or description data items to include additional words or phrases; and
generating the requestor dataset by numericizing the expanded textual data features or description data items.

19. The method of claim 18, further comprising:
identifying the additional words or phrases according to the textual data features or description data items and a lexical database, the lexical database comprising a plurality of words or phrases each characterized by its popularity and a plurality of numerically quantified connections between the plurality of words or phrases;
identifying the additional words or phrases by selection from the plurality of words and phrases in the lexical database having a sum of popularity and weighted connection to the textual data features or description data items over a predetermined threshold value; and evolving the popularity of the plurality of words and phrases and weighted connection therebetween in the lexical database via incremental learning.

20. A system comprising:
a memory circuitry for storing computer instructions;
a network interface circuitry; and
a processor in communication with the network interface circuitry and the memory circuitry, the processor configured to execute the computer instructions to:
receive an encryption key and a partial decryption key reference corresponding to the encryption key;
receive a listing of homomorphically encrypted requestor descriptors from a requesting device, the listing of homomorphically encrypted requestor descriptors generated by the requesting device using the encryption key and using a predefined homomorphic encryption algorithm applied to a requestor dataset;
retrieve an original comparer dataset;
extract textual data features or description data items from the original comparer dataset;
expand the textual data features or description data items to include additional words or phrases;
generate a requestor dataset by numericizing the expanded textual data features or description data items;
generate a list-matching indicator indicating an overlap between the requestor dataset and the listing of homomorphically encrypted requestor descriptors;
encrypt the list-matching indicator to generate a homomorphically encrypted list-matching indicator using the predefined homomorphic encryption algorithm;
send the homomorphically encrypted list-matching indicator to the requesting device; and
in response to a key reference request from the requesting device, send the partial decryption key reference to the requesting device.

* * * * *